United States Patent [19]

Lipper

[11] Patent Number: 5,104,197
[45] Date of Patent: Apr. 14, 1992

[54] REINFORCED WHEEL

[75] Inventor: Raymond W. Lipper, Newport Beach, Calif.

[73] Assignee: Center Line Tool Co., Inc., Santa Fe Springs, Calif.

[21] Appl. No.: 527,764

[22] Filed: May 23, 1990

[51] Int. Cl.⁵ ............................ B60B 25/02; B60B 3/12
[52] U.S. Cl. .................................. 301/11 R; 301/63 D
[58] Field of Search ............... 301/9 R, 10 R, 10 DC, 301/11 R, 11 CD, 63 D; 152/396, 404, 405

[56] References Cited

U.S. PATENT DOCUMENTS

| | | | |
|---|---|---|---|
| 1,586,545 | 6/1926 | Williams | 301/11 R X |
| 1,589,449 | 6/1926 | Williams | 301/63 D |
| 1,795,472 | 3/1931 | Budd | 152/405 X |
| 2,229,724 | 1/1941 | Burger et al. | 152/404 |
| 3,880,219 | 4/1975 | Mitchell | 301/63 D X |

*Primary Examiner*—Russell D. Stormer
*Attorney, Agent, or Firm*—Graham & James

[57] ABSTRACT

A reinforced vehicle wheel having high loadability, long service life, relatively light weight, and simple construction has reinforcing links attached to the wheel hub near the region where the hub transitions into the rim. The reinforcing links preferably are formed of heavy gauge metal having a high modulus of elasticity and are mounted to the hub by way of rivets or other type fasteners. In the case of a multi-piece wheel, fasteners which are used to facilitate the joining of the wheel pieces may also be used to mount the reinforcing links to the hub.

3 Claims, 1 Drawing Sheet

REINFORCED WHEEL

BACKGROUND OF THE INVENTION

1. Field of the Invention

The present invention generally relates to a wheel, and more particularly to a reinforced vehicle wheel capable of sustaining heavy loads and having a long service life, without being unduly heavy. The reinforced wheel of the present invention is particularly well-suited for use with a four-wheel-drive vehicle but may be used wherever a wheel having especially high strength is required.

2. Description of Related Art

Vehicle wheels generally are subjected to heavy loads. In particular, wheels on four-wheel-drive vehicles must be capable of withstanding especially high stresses since such vehicles commonly are driven over rough terrain. A four-wheel-drive vehicle wheel must have high loadability (i.e., be capable of sustaining heavy loads) and high fatigue strength, yet maintain a reasonable weight.

A wheel commonly is formed from multiple pieces (i.e., a multi-piece wheel). For example, one type of two-piece wheel has two wheel sections each having a center portion and a rim portion which are aligned and joined to form a wheel hub and wheel rims, respectively. Another type of two-piece wheel is formed of a unitary rim section which is secured to a separate hub section by way of rivets or other fasteners. One type of three-piece wheel has inner and outer rim portions which are joined to a hub. In contrast, a one-piece wheel is made from a single piece by e.g., casting or forging and rolling. Regardless of whether a wheel is multi-piece or one-piece, the wheel is highly susceptible to failure in the region where the hub transitions into the rim (the "transition region"). The transition region has a relatively sharp bend where the periphery of the substantially vertical hub contacts the substantially horizontal rim and hence is particularly prone to failure. Wheel failures commonly include tangential cracks or catastrophic failure along the circumferential edge of the transition region. In the case of multi-piece wheels, the wheel pieces typically are joined together by fasteners in the outer region of the hub adjacent the transition region. It is not unusual for such a multi-piece wheel to sustain cracks at the assembly holes through which the fasteners are inserted. Exotic materials and complicated wheel designs may be used to minimize the possibility of wheel failure. However, these approaches are relatively costly. A wheel having high loadability, long service life, relatively light weight, and simple construction at relatively low cost is highly desirable.

SUMMARY OF THE INVENTION

The present invention provides a reinforced wheel having high loadability, long service life, relatively light weight, and simple construction at relatively low cost. The wheel is reinforced in the general region where the hub transitions into the rim. Reinforcement is achieved by attaching a series of reinforcing links around the edge of a wheel hub near the transition region. Each reinforcing link is mounted to the hub by way of plural rivets or other fasteners. In the case of a multi-piece wheel, the same fasteners which are used to join the wheel pieces together may also be used to attach the reinforcing links to the hub.

The provision of a series of reinforcing links around the hub of a wheel adjacent the transition region substantially increases the service life of a wheel, even one which continually is subjected to particularly high loads. In the preferred embodiment of the present invention, the fasteners which are used to join the pieces of a multi-piece wheel are used also to attach the reinforcing links to the hub. Each reinforcing link is attached to the hub by two fasteners and thus, unlike a washer, serves to effectively bolster the area between each of the two associated fasteners. Furthermore, each end of each reinforcing link extends beyond the associated fastener and hence the reinforcing links reinforce the entire area adjacent each fastener hole.

The preferred embodiment of the present invention uses a series of relatively short links to reinforce a wheel. Alternately, a full ring, two half-rings, or reinforcing members spanning three or more fasteners can be used. However, these alternative approaches have the disadvantage of a comparatively substantial increase in mass and greater potential for buckling. In contrast, the series of links of the preferred embodiment substantially increases the loadability of a wheel with a relatively minimal increase in mass. Additionally, the links are less vulnerable to failure than a full ring, a half-ring, or any other more extensive reinforcing member.

DETAILED DESCRIPTION OF THE PREFERRED EMBODIMENT

Figure 2:
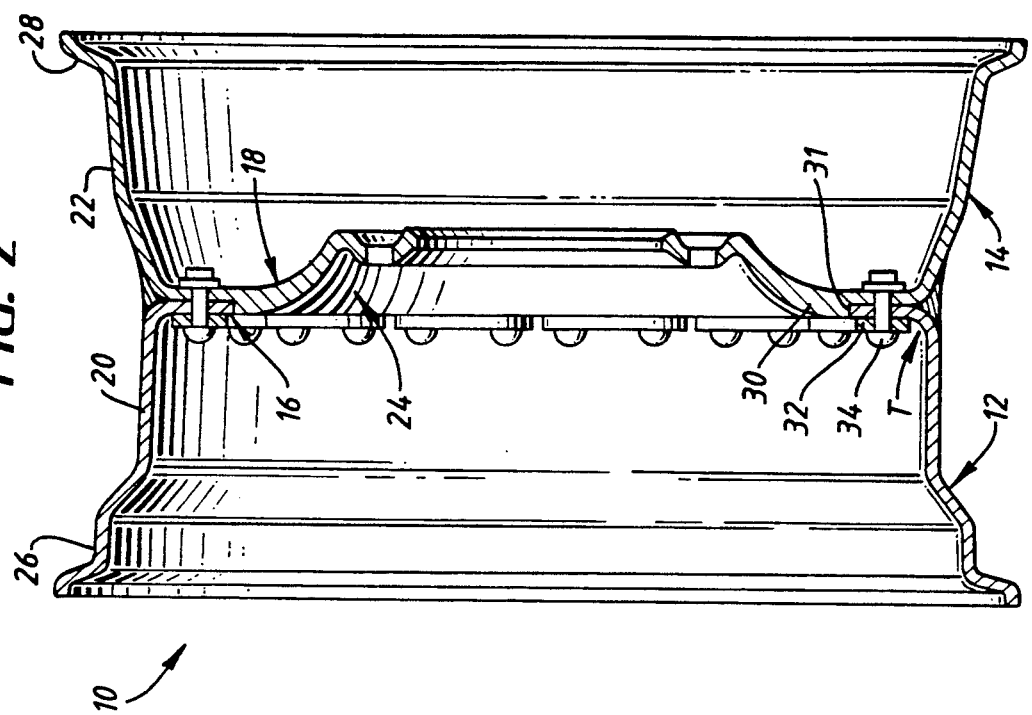
FIG. 2 is a sectional view of the wheel.
Figure 1:
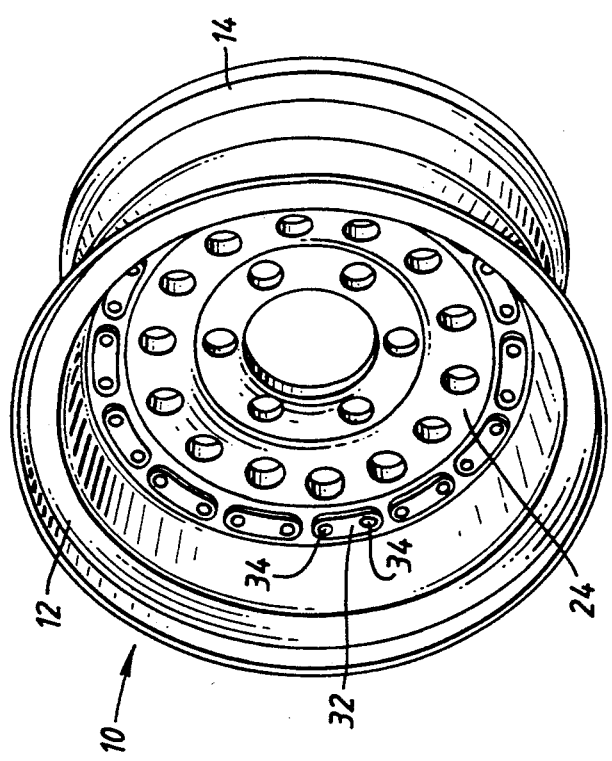
FIG. 1 is a perspective view of an embodiment of a wheel incorporating the principles of the present invention.
Figure 3:
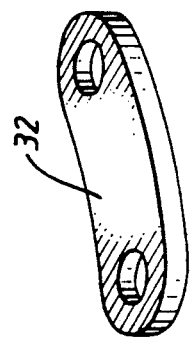
FIG. 3 is a perspective view of a reinforcing link used to reinforce the wheel in FIG.1.

FIGS. 1–3 illustrate a preferred embodiment of the present invention. This embodiment uses a multi-piece wheel 10 having a first primary member 12 and a second primary member 14, provided with first and second center portions 16 and 18 and first and second rim portions 20 and 22 extending from the periphery of the first and second center portions 16 and 18, respectively, as shown in FIG. 1. FIG. 2 illustrates that the first and second center portions 16 and 18 are shaped to join together to form a wheel hub 24 and the first and second rim portions 20 and 22 form outer and inner wheel rims 26 and 28, respectively. A disk 30 at the center of the second primary member 14 is inserted in a circular opening 3 in the center of the first primary wheel member 12, and the first and second primary wheel members 12 and 14 are welded together to form a wheel 10 in a conventional manner.

The region T of the wheel 10 where the hub 24 transitions into the outer rim 26 is subjected to especially high stresses during use and is particularly vulnerable to failure. In order to reduce the potential for failure, the present invention mounts a series of reinforcing links 32 to the hub 24 adjacent the transition region T as shown in FIGS. 1 and 2. Each reinforcing link 32 preferably is made of relatively heavy gauge metal having a high modulus of elasticity and has a slight radius formed therein as shown in FIG. 3. The radius of each reinforcing link 32 and the radius of the wheel 10 at a corresponding position have a common origin. Each end of each reinforcing link 32 is fastened to the hub 24 by way of a rivet 34 or other type fastener (FIG. 2). In the preferred embodiment, the fasteners which are used to facilitate the joining of the wheel pieces are also used to mount the reinforcing links 32 to the wheel hub 24.

A preferred embodiment of the present invention has been described above. It is understood that one may make various modifications to the disclosed embodiment without departing from the spirit and scope of the invention. For example, the reinforcing links may be mounted to the inner side of the hub or to both the outer and inner sides of the hub rather than just to the outer side of the hub. Also, the reinforcing links may be made of any material having high stiffness. Furthermore, a one-piece wheel may be reinforced in accordance with the principles of the present invention. Hence, the present invention is not limited to the preferred embodiment described herein, but may be altered in a variety of ways which would be apparent to one of ordinary skill in the art.

I claim:

1. A multi-piece wheel, comprising:
a first primary member having first center portion and a first rim portion extending from the periphery of said first center portion;
a second primary member having a second center portion and a second rim portion extending from the periphery of said second center portion, wherein said first and second center portions are aligned to form a wheel hub and said first and second rim portions are aligned to form a wheel rim;
a plurality of reinforcing links of uniform thickness located on the hub adjacent the periphery of a center portion, the reinforcing links being arranged in a circle concentric to the circle defined by the periphery; and
a plurality of permanent fasteners passing through holes in each of the first and second center portions and the reinforcing links and permanently securing the first and center portions and reinforcing links together, wherein at least two fasteners pass through each reinforcing link.

2. A multi-piece wheel as in claim 1 wherein the fasteners are rivets.

3. A multi-piece wheel as in claim 1 wherein a reinforcing link is located adjacent every hole in the first and second center portions thereby to provide reinforcement at every fastener.

* * * * *